(12) United States Patent
Taratine

(10) Patent No.: US 11,924,270 B2
(45) Date of Patent: Mar. 5, 2024

(54) METHOD AND SYSTEM FOR TRANSFERRING DATA

(71) Applicant: Visa Europe Limited, London (GB)

(72) Inventor: Boris Taratine, London (GB)

(73) Assignee: Visa Europe Limited, London (GB)

( * ) Notice: Subject to any disclaimer, the term of this patent is extended or adjusted under 35 U.S.C. 154(b) by 59 days.

(21) Appl. No.: 17/690,686

(22) Filed: Mar. 9, 2022

(65) Prior Publication Data

US 2022/0201064 A1    Jun. 23, 2022

Related U.S. Application Data

(63) Continuation of application No. 16/418,542, filed on May 21, 2019, now Pat. No. 11,381,632, which is a
(Continued)

(30) Foreign Application Priority Data

Mar. 19, 2013    (GB) ..................... 1305040

(51) Int. Cl.
  *G06Q 20/38*    (2012.01)
  *G06Q 20/42*    (2012.01)
  (Continued)

(52) U.S. Cl.
  CPC ............. *H04L 67/06* (2013.01); *G06Q 20/38* (2013.01); *G06Q 20/382* (2013.01); *G06Q 20/425* (2013.01); *H04L 69/08* (2013.01)

(58) Field of Classification Search
  CPC .................................................. G06Q 40/00
  (Continued)

(56) References Cited

U.S. PATENT DOCUMENTS

| | | | | |
|---|---|---|---|---|
| 5,198,975 A | * | 3/1993 | Baker | .................... G06Q 40/02 |
| | | | | 705/30 |
| 5,237,159 A | * | 8/1993 | Stephens | ................ G06Q 40/02 |
| | | | | 705/45 |

(Continued)

FOREIGN PATENT DOCUMENTS

| | | |
|---|---|---|
| KR | 20000048436 | 7/2000 |
| KR | 20070034603 | 3/2007 |

(Continued)

OTHER PUBLICATIONS

U.S. Appl. No. 14/858,185, Final Office Action, dated Sep. 6, 2018, 17 pages.

(Continued)

*Primary Examiner* — Kirsten S Apple
(74) *Attorney, Agent, or Firm* — Kilpatrick Townsend & Stockton LLP

(57) ABSTRACT

Systems, methods and computer programs for transferring data in a communication system are described. The communication system has a first node arranged to send data to a plurality of second nodes using a first protocol. The first protocol allows the transfer of data of a first type. At least one of the second nodes additionally requires data of a second type, which is not included in the data sent according to the first protocol. First data, of the first type, is transferred to a plurality of the second nodes using the first protocol. Second data, of the second type, is stored in a memory. Subsequently, in response to a request, access to the second data is provided to the second node.

20 Claims, 5 Drawing Sheets

Related U.S. Application Data continuation of application No. 14/858,185, filed on Sep. 18, 2015, now Pat. No. 10,348,805, which is a continuation of application No. PCT/GB2014/050866, filed on Mar. 19, 2014.

(51) Int. Cl.
*H04L 67/06* (2022.01)
*H04L 69/08* (2022.01)

(58) Field of Classification Search
USPC .......................................................... 705/35
See application file for complete search history.

(56) References Cited

U.S. PATENT DOCUMENTS

| | | | | |
|---|---|---|---|---|
| 5,412,190 | A * | 5/1995 | Josephson | G07F 7/0866 705/45 |
| 5,532,464 | A * | 7/1996 | Josephson | G06Q 20/14 705/45 |
| 5,691,524 | A * | 11/1997 | Josephson | G06Q 20/102 705/40 |
| 5,717,868 | A * | 2/1998 | James | G06Q 20/10 705/35 |
| 5,783,808 | A * | 7/1998 | Josephson | G06Q 20/14 235/379 |
| 5,917,965 | A * | 6/1999 | Cahill | G06F 16/40 382/305 |
| 6,301,379 | B1 * | 10/2001 | Thompson | G06Q 40/02 382/137 |
| 6,327,578 | B1 | 12/2001 | Linehan | |
| 6,398,646 | B1 | 6/2002 | Wei et al. | |
| 7,099,845 | B2 * | 8/2006 | Higgins | G06Q 20/042 705/45 |
| 7,165,723 | B2 * | 1/2007 | McGlamery | G06V 10/98 235/379 |
| 7,447,347 | B2 * | 11/2008 | Weber | G06V 30/2253 382/306 |
| 7,644,019 | B2 | 1/2010 | Woda et al. | |
| 10,348,805 | B2 | 7/2019 | Taratine | |
| 2001/0011250 | A1 | 8/2001 | Paltenghe et al. | |
| 2002/0174068 | A1 * | 11/2002 | Marsot | G06Q 20/40 705/39 |
| 2002/0178122 | A1 | 11/2002 | Maes | |
| 2003/0037002 | A1 * | 2/2003 | Higgins | G06Q 40/00 705/45 |
| 2003/0208421 | A1 * | 11/2003 | Vicknair | G06Q 20/102 705/45 |
| 2003/0225705 | A1 * | 12/2003 | Park | G06Q 20/382 705/64 |
| 2005/0137960 | A1 * | 6/2005 | Brann | G06Q 40/04 705/37 |
| 2007/0204157 | A1 | 8/2007 | Romm | |
| 2008/0147564 | A1 | 6/2008 | Singhal | |
| 2008/0167000 | A1 | 7/2008 | Wentker et al. | |
| 2008/0167017 | A1 | 7/2008 | Wentker et al. | |
| 2008/0167961 | A1 | 7/2008 | Wentker et al. | |
| 2008/0172317 | A1 | 7/2008 | Deibert et al. | |
| 2008/0319869 | A1 | 12/2008 | Carlson et al. | |
| 2009/0100499 | A1 | 4/2009 | Bauer et al. | |
| 2010/0017334 | A1 | 1/2010 | Itoi et al. | |
| 2011/0029780 | A1 | 2/2011 | Pinkas et al. | |
| 2011/0213711 | A1 | 9/2011 | Skinner et al. | |
| 2012/0011008 | A1 * | 1/2012 | Sivapathasundram | G06Q 20/20 705/16 |
| 2012/0072346 | A1 | 3/2012 | Barkan Daynovsky et al. | |
| 2013/0151400 | A1 * | 6/2013 | Makhotin | G06Q 20/3229 705/39 |
| 2013/0325711 | A1 * | 12/2013 | Geslin | G06Q 20/204 705/41 |
| 2014/0089120 | A1 * | 3/2014 | Desai | G06Q 20/322 705/39 |
| 2014/0089182 | A1 * | 3/2014 | Short | H04L 61/25 705/40 |
| 2014/0250006 | A1 * | 9/2014 | Makhotin | G06Q 20/326 705/41 |
| 2014/0330721 | A1 * | 11/2014 | Wang | G06Q 20/40 705/44 |
| 2014/0358789 | A1 * | 12/2014 | Boding | G06Q 20/405 705/44 |

FOREIGN PATENT DOCUMENTS

| | | |
|---|---|---|
| KR | 20070120125 | 12/2007 |
| WO | 2006004794 | 1/2006 |
| WO | 2006113834 | 10/2006 |
| WO | 2012073014 | 6/2012 |
| WO | 2014147399 | 9/2014 |

OTHER PUBLICATIONS

U.S. Appl. No. 14/858,185, Non-Final Office Action, dated Feb. 21, 2018, 20 pages.
U.S. Appl. No. 14/858,185, Notice of Allowance, dated Feb. 21, 2019, 5 pages.
U.S. Appl. No. 16/418,542, Non-Final Office Action, dated Jul. 22, 2021, 6 pages.
U.S. Appl. No. 16/418,542, Notice of Allowance, dated Dec. 9, 2021, 7 pages.
EP14718448.5, "Summons to Attend Oral Proceedings", Apr. 23, 2019, 11 pages.
Application No. KR10-2015-7029687, Office Action, dated May 20, 2020, 12 pages.
U.S. Appl. No. 16/512,977, Final Office Action, dated May 11, 2023, 21 pages.
Indian Application No. 6422/CHENP/2015, Hearing Notice, Jul. 14, 2023, 3 pages.

* cited by examiner

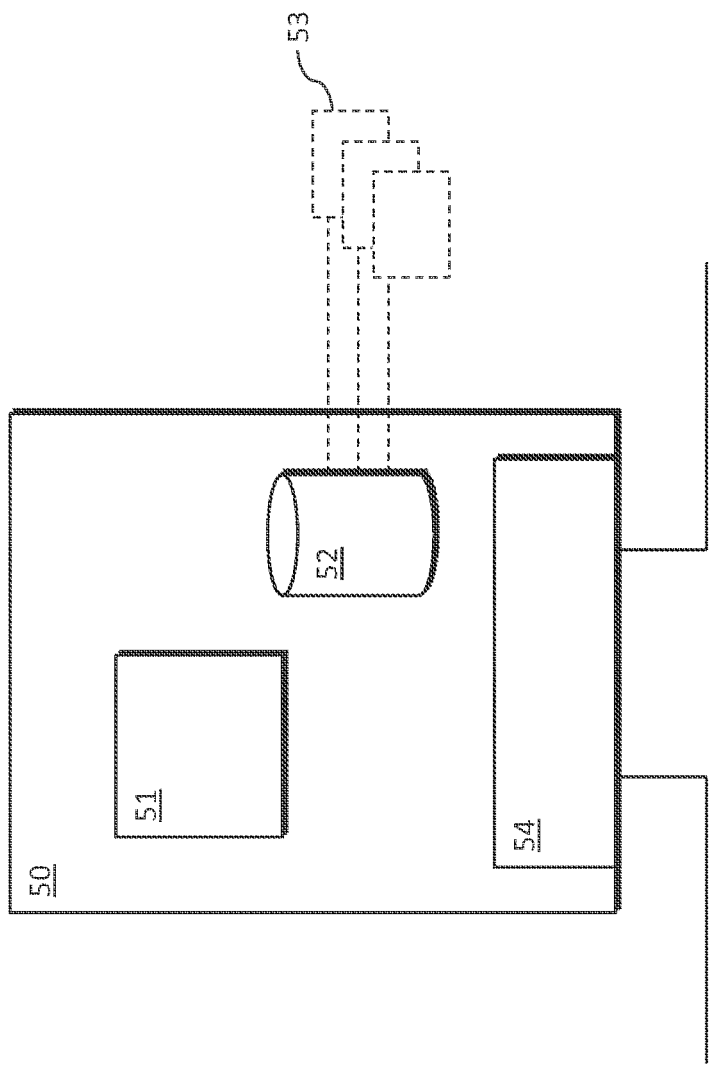

METHOD AND SYSTEM FOR TRANSFERRING DATA

CROSS-REFERENCE TO RELATED APPLICATIONS

This application is a continuation of U.S. application Ser. No. 16/418,542 filed May 21, 2019, which is a continuation of U.S. application Ser. No. 14/858,185, filed Sep. 18, 2015, which is a continuation of International Application No. PCT/GB2014/050866, filed Mar. 19, 2014, which claims the benefit of GB Application No. 1305040.6, filed Mar. 19, 2013. Each of the above-referenced patent applications is incorporated by reference in its entirety.

BACKGROUND OF THE INVENTION

Field of the Invention

The present invention relates to systems and methods for transferring data where data of a first type is transferred to a node using a protocol, and where second data, of a type not included in the protocol, is made available for retrieval by the node.

Description of the Related Technology

In communications systems, protocols are defined to enable the transfer of data between different network nodes. Any given protocol may specify a number of aspects of how data is to be transferred. Data of a first type, included in the protocol, can be transferred using that protocol. Data of a second type, not included in the protocol, may not be transferable.

Any number of factors may differentiate the data of the first type from that of the second. For example, a given protocol may specify certain data fields. Data capable of being transferred according to the protocol, i.e. data of the first type, must correspond to one of the specified fields. Data which does not correspond to a specified field, i.e. data of the second type, is not included in the protocol and therefore cannot be easily transferred.

When it is desired for data of this second type to be transferred from a first to a second node, the typical solution is to update the protocol to include this second type of data; in other words by updating a legacy protocol standard to include new fields. However this can be difficult for a number of reasons. For example, any given first node (the sending node) may need to be able to communicate with multiple second (receiving) nodes. Where only a subset of the second nodes require the data of the second type, ensuring compatibility between the first node and all of the second nodes can be difficult. Additionally, in some systems, the data is transferred from the first to the second node via one or more third nodes. Therefore, updating the protocol requires updating not only the first and second nodes, but all the third nodes as well. This can be difficult, especially when the third nodes are operated by organizations other than those operating the first and second nodes.

Therefore, it is desirable to provide methods and systems which enable the transfer of such data.

SUMMARY

In accordance with at least one embodiment, methods, devices, systems and software are provided for supporting or implementing functionality to transfer data.

This is achieved by a combination of features recited in each independent claim. Accordingly, dependent claims prescribe further detailed implementations of various embodiments.

According to a first aspect of the invention there is provided a method of transferring data in a communications system, the communications system comprising at least one first node arranged to send data to a plurality of second nodes using a first protocol, the first protocol allowing the transfer of data of a first type, and wherein at least one of said plurality of second nodes further requires data of a second type, not included in the data sent according to the first protocol, the method comprising: transferring first data to a plurality of the second nodes using the first protocol, the first data being of the first type; storing second data in a memory, the second data being of the second type; and responsive to a request, providing access to at least a part of the second data to the second node.

In many communications systems, protocols are set up to allow for data to be transferred from one node to another. The protocols establish the type of the content which may be transferred using the protocol. Once established, protocols become difficult to change, as each node needs to be updated to be able to use a modified protocol. Accordingly it is difficult to change the types of data which can be transferred (i.e. by adding new fields, or expanding existing fields).

Embodiments configured to perform the above method overcome this problem by using a first protocol to transfer first data of a first type supported by the first protocol, while storing second data, which is not included in the data sent according to the first protocol, in a memory. This second data can then be retrieved by a second node as required. This provides the advantage that additional data, i.e. data of the second type, can be provided without having to modify the protocol.

Moreover, only second nodes which desire the second type of data need retrieve the second data. Any second node which does not desire the additional second type of data, does not need to change any part of its operation, as the data provided by the first protocol will still be provided in the usual manner.

The first data may comprise a plurality of first data items, and the second data may comprise a plurality of second data items associated with corresponding first data items. Furthermore, the request may comprise data identifying at least one second data item. This data identifying at least one second data item may correspond to an identity of said at least one second node. Alternatively or additionally, the data identifying at least one second data item may correspond to data included in a corresponding first data item. In some embodiments, the first data items may comprise identifiers, and the at least one second data item may be stored in association with an identifier of a corresponding first data item.

In other words, data items within the first data are associated with data items within the second data. This may be enabled using identifiers shared between corresponding first and second data items. This in turn enables a second node to easily retrieve second data corresponding to first data received using the first protocol. In some embodiments, the identity of the second node may be used to access the data, with a plurality of second data parts being provided to the second node based on that identity.

The method may comprise generating at least a part of a second data item using at least a part of a corresponding first data item as an input to a data processing algorithm. The data processing algorithm may compute a hash function. Alternatively or additionally, the data processing algorithm may compute a digital signature. This digital signature may be computed using a cryptographic key.

In embodiments, the first data, that is the data which is supported by the first protocol, may be used to generate the second data. The second data may subsequently be used to determine whether the first data has been modified in transit between the first and second nodes. To generate this data, the first node may sign the data, and/or generate a hash function of the data (which may have been and/or may subsequently be signed). The hashed and/or signed data may then be stored in the memory.

The first node and the second node may have a trust relationship. Furthermore, the first data may be sent via at least a third node which does not have a trust relationship with the first and the second node. The first data sent using the first protocol may be sent in accordance with a format, said format being one that can be interpreted by the third node. The first, the second and the third node may be arranged to cooperate in an interaction for which both the second node and the third node require said first data.

By having a trust relationship, the at least one second node knows that data sent, and stored in the memory, by the first node can be trusted, i.e. is correct and can be relied upon. However this may not be the case for the third node, and therefore any data sent via the third node cannot be trusted. This is particularly significant when the protocol specifies that the data is readable, and therefore editable, by the third node (this can be contrasted with a network node which merely routes the data on towards the second node). The third node may require the data to be readable because the first, at least one second and at least one third nodes are arranged to cooperate in an interaction or which the first data is required. It will be apparent that when the second data is encrypted or hashed, and optionally signed, the memory can be made publicly available, and the second data may be sent via an alternative route which involves transmitting data to and from untrusted nodes The first data may be transferred to the plurality of second nodes via one or more further network nodes, each supporting the first protocol. At least one of the one or more further network nodes may not support a protocol capable of transferring data of the second type.

As described above, the network, and in particular the nodes between the first and second nodes, do not need to be able to support the second type of data, and indeed may not do so. This means that with changes only to the first node, and any relevant second node, both the first and second types of data may be transferred to the second node. This makes it easier to transfer the second data, as the modifications to the existing system are small and, in some cases, may not be required at all.

The first protocol may define a plurality of fields, and the first data may comprise data corresponding to at least one of the fields. Furthermore, the second data may comprise at least some data which does not correspond to the fields of the first protocol.

In embodiments, the network may comprise a payment processing network, and the first data may comprise transaction data. As such, the first node may comprise one or more of: a trusted intermediary arranged to provide transaction data on behalf of a customer; a merchant data processing system; a payment service provider (PSP); and an acquiring bank data processing system. Furthermore, the network may comprise one or more third nodes between the first and second nodes, the one or more nodes may comprise at least one of: a merchant data processing system; a payment service provider (PSP); an acquiring bank data processing system; and a card system data processing system. Additionally, the at least one second node may comprise one or more of: an issuing bank computing system; a fraud detection processing system; and an accounting system.

According to a second aspect of the invention there is provided a method of processing payment data associated with payment transactions conducted via a network, the network comprising, at least one acquiring bank data processing system, at least a first network node arranged to provide payment data to at least one said acquiring bank data processing system and at least a second network node arranged to receive payment data from at least one said acquiring bank data processing system, wherein, during a given payment transaction, payment data associated with the payment transaction is sent from the first network node to the second network node via at least one said acquiring bank data processing system, the method comprising: storing, at a network node other than the at least one acquiring bank data processing system, further data associated with the transaction from the first network node, at least some of the further data being other than the payment data; and allowing access to the further data by the second network node.

The payment data associated with the payment transaction may be sent from the first network node to the second network node via at least one said acquiring bank data processing system using at least a first protocol, and the further data may comprise data not included in the first protocol.

According to a third aspect of the invention there is provided a computer program product comprising a non-transitory computer-readable storage medium having computer readable instructions stored thereon, the computer readable instructions being executable by a computerized device to cause the computerized device to perform a method of transferring data in a communications system, wherein the communications system comprises at least one first node arranged to send data to a plurality of second nodes using a first protocol, the first protocol allowing the transfer of data of a first type, and wherein at least one of said plurality of second nodes further requires data of a second type, not included in the data sent according to the first protocol, the method comprising: transferring first data to a plurality of the second nodes using the first protocol, the first data being of the first type; storing second data in a memory, the second data being of the second type; and responsive to a request, providing access to at least a part of the second data to the second node.

According to a fourth aspect of the invention there is provided a computer program product comprising a non-transitory computer-readable storage medium having computer readable instructions stored thereon, the computer readable instructions being executable by a computerized device to cause the computerized device to perform a method of processing payment data associated with payment transactions conducted via a network, the network comprising, at least one acquiring bank data processing system, at least a first network node arranged to provide payment data to at least one said acquiring bank data processing system and at least a second network node arranged to receive payment data from at least one said acquiring bank data processing system, wherein, during a given payment transaction, payment data associated with the payment transaction is sent from the first network node to the second network node via at least one said acquiring bank data processing system, the method comprising: storing, at a network node other than the at least one acquiring bank data processing system, further data associated with the transaction from the first network node, at least some of the further data being other than the payment data; and allowing access to the further data by the second network node.

According to a fifth aspect of the invention there is provided an apparatus for transferring data in a communications system, wherein the communications system comprises at least one first node arranged to send data to a plurality of second nodes using a first protocol, the first protocol allowing the transfer of data of a first type, and wherein at least one of said plurality of second nodes further requires data of a second type, not included in the data sent according to the first protocol, the apparatus configured to: transfer first data to a plurality of the second nodes using the first protocol, the first data being of the first type; store second data in a memory, the second data being of the second type; and responsive to a request, provide access to at least a part of the second data to the second node.

According to a sixth aspect of the invention, there is provided an apparatus for processing payment data associated with payment transactions conducted via a network, the network comprising at least one acquiring bank data processing system, at least a first network node arranged to provide payment data to at least one said acquiring bank data processing system and at least a second network node arranged to receive payment data from at least one said acquiring bank data processing system, wherein, during a given payment transaction, payment data associated with the payment transaction is sent from the first network node to the second network node via at least one said acquiring bank data processing system, the apparatus configured to: store, at a network node other than the at least one acquiring bank data processing system, further data associated with the transaction from the first network node, at least some of the further data being other than the payment data; and allow access to the further data by the second network node.

Further features and advantages will become apparent from the following description of preferred embodiments, given by way of example only, which is made with reference to the accompanying drawings.

BRIEF DESCRIPTION OF THE DRAWINGS

Systems, apparatuses, and methods will now be described as embodiments, by way of example only, with reference to the accompanying figures in which:

FIG. 5 shows a schematic diagram of a network node which may be used in embodiments of the invention.

Some parts, components and/or steps of the embodiments appear in more than one Figure; for the sake of clarity the same reference numeral will be used to refer to the same part, component or step in all of the Figures.

DETAILED DESCRIPTION OF CERTAIN INVENTIVE EMBODIMENTS

Figure 1:
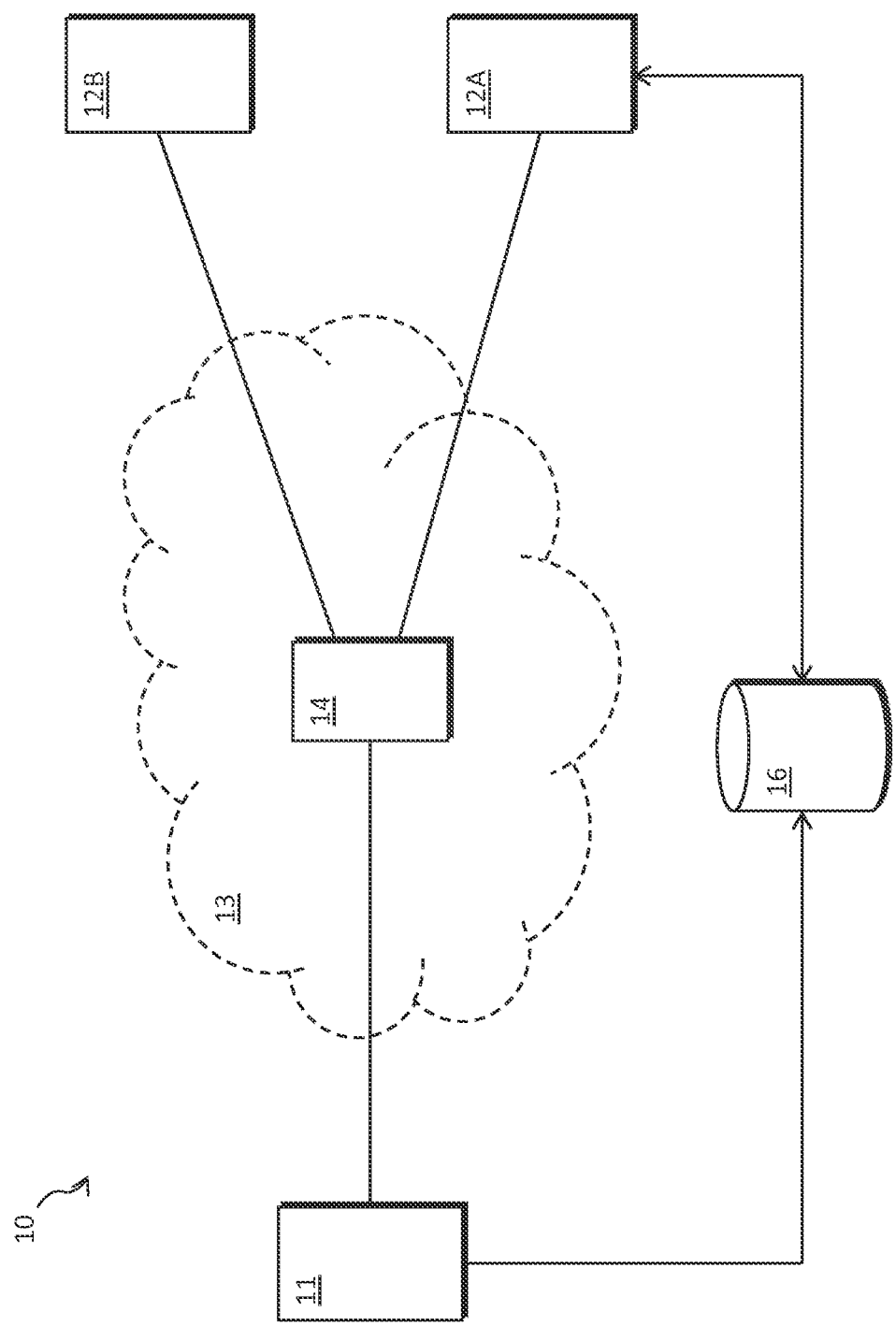
FIG. 1 shows a schematic diagram of a communications system in which embodiments of the invention may be practiced.

FIG. 1 shows a communications system 10 in which data of a first type can be sent from a first node 11 to a plurality of second nodes 12A and 12B using a first protocol, and in which data of a second type, not included in the first protocol, can be transferred to one of the second nodes 12A.

The first node 11 is connected to the second nodes 12A and 12B via a network 13. The network 13 may comprise any number of third nodes, with one, node 14, being shown. First node 11 is connected to the third node 14, which in turn is connected to second nodes 12A and 12B. All of first, second and third nodes 11, 12A/12B and 14 are capable of transferring data according to a first protocol. In addition, the first node 11, and second node 12A have connections to a memory 16.

Figure 2:
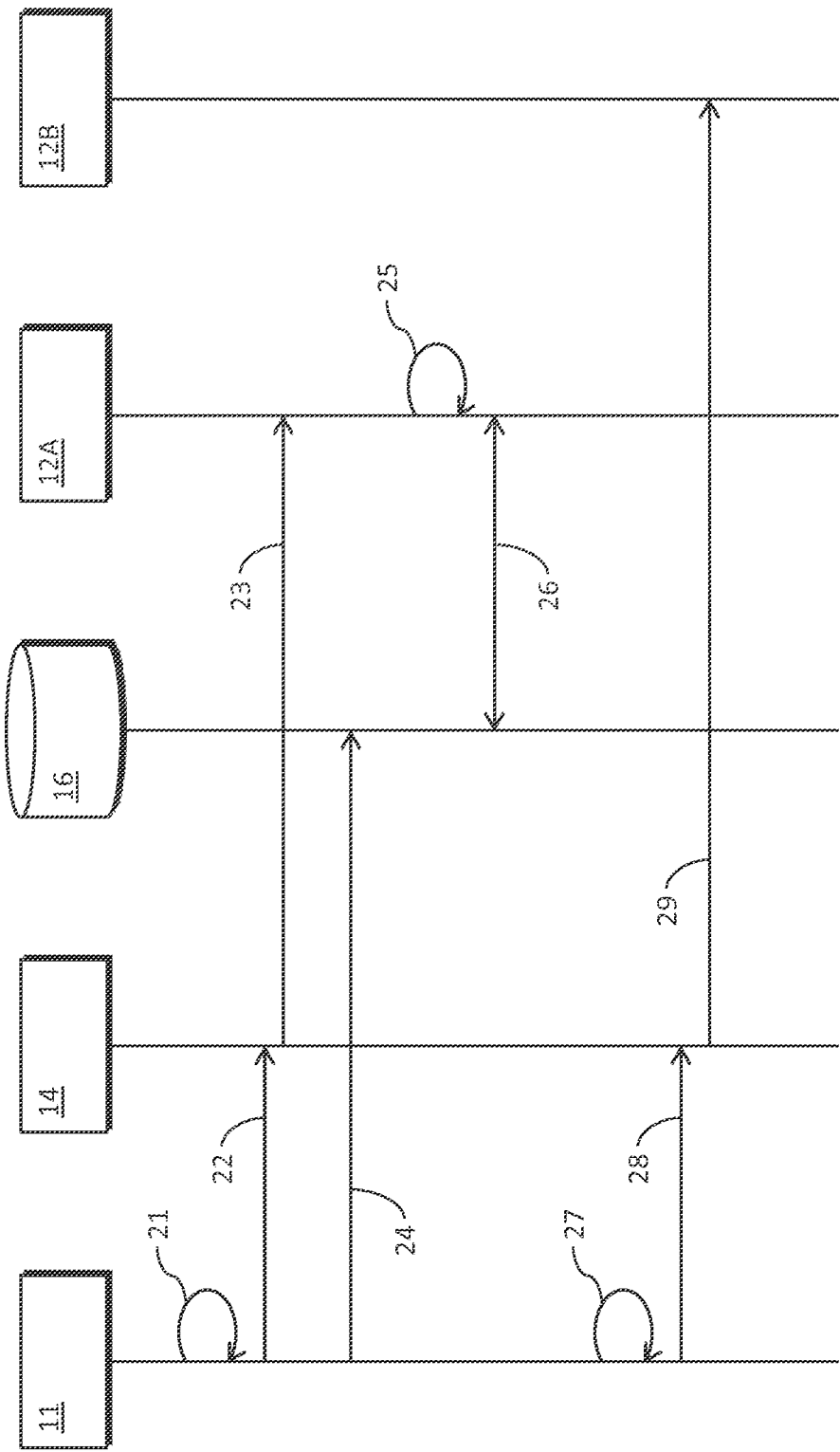
FIG. 2 illustrates a method according to an embodiment.

A method of transferring data in the communications system 10 will now be described with reference to FIG. 2. As stated above, the communications system comprises a first node 11 which is arranged to send data to the second nodes 12A and 12B.

In a first step 21, the first node 11 may generate, identify or otherwise determine data to be sent to second node 12A. While some of the data will be sent using a first protocol, the second node 12A requires data which is not included in this first protocol. As such, the data may be separated into two types, a first type of data which can be sent using the first protocol, and a second type, at least a part of which is not included in the first protocol and therefore cannot be sent using the first protocol. Step 21 may include the steps of identifying that the data is to be sent to a second node 12A which requires the second data, and separating the data accordingly.

Subsequently, in steps 22 and 23, first data, being of the first type included in the protocol, is transferred from the first node 11 to the second node 12A via the third node 14. In addition, as shown by step 24, the second data, being of the second type and not included in the protocol, is stored in the memory 16. Following these steps, in steps 25 and 26, the second node 12A may access the second data stored in the memory 16. To enable this access, the second node 12A may, in step 25, determine that first data has been received, and accordingly, in step 26, request access to the second data in the memory 16.

In addition, the first node 11 may transfer data to a further second node 12B. This further second node 12B does not require data of the second type. As such, in step 27, analogous to step 21, the first node 11 generates the data to be sent to the further second node 12B. This step may include the first node 11 identifying the further second node 12B, and determining that the further second node 12B does not require data of the second type, i.e. data not included in the protocol. Following step 27, in step 28, the first node 11 may transfer first data (of the first type) to the third node 14, from where, in step 29, it is transferred to the further second node 12B.

As such, it is possible to transfer the data of the second type to the second node 12A which requires it, without any other changes in the protocol. In particular, neither the further second node 12B, nor the third node or nodes 14 in the network 13 required modification for the above to operate.

To enable the effective transfer of the data, the first and second data may comprise a plurality of first and second data items respectively. The second data items may be associated with corresponding first data items. As such, in step 26, the second node 12A may make a request comprise data identifying one or more of the second data items which are desired by the second node 12A.

This identifying data may be the identity of the second node 12A. In response, the memory 16 may provide all second data items which are associated with first data items sent to that particular second node 2A. Alternatively, the identifying data may correspond to data included in a corresponding first data item. As such, the second node 12A, in step 25, may use a received first data item to determine the identifying data to be provided in the request in step 26. One method by which this may be done is to include an identifier in the first data item, and store the second data item in association with the provided identifier.

The first protocol may define a plurality of fields, and the first data accordingly may comprise data corresponding to at least one of the fields. As such, the second data may comprise at least some data which does not correspond to the fields of the first protocol. This out-of-protocol data may include information which is only relevant to the second node 12A.

However, in some embodiments, the second data items may be generated from the first data items. For example, at least a part of a second data item may be generated using at least a part of a corresponding first data item as an input to a data processing algorithm. This data processing algorithm may compute a hash function of the first data. Alternatively, or additionally, the data processing algorithm may compute a digital signature. In order to generate the signature, the first node may use a private key. Alternatively, the first and the second node may share a secret and the digital signature may be computed using the shared secret.

By storing this hashed and/or signed data in the memory 16, the second node 12A is able to determine whether the first data has been modified in transit between the first and second nodes, i.e. by the third node 14. The hashed/signed data may be stored in association with an identifier which is provided in the corresponding first data item. For example, the first data item (D1) may have the following format:

D1={ID, F1, F2, F3, . . . , FN} where ID is an identifier and F1 etc. represent fields within the first data. As will be apparent, these fields are included in the first protocol.

The corresponding second data item (D2) may have the following format:

D2={ID, S(H(D1))} where the functions S( ) and H( ) represent functions for generating a digital signature and hashing respectively.

By signing the first data, or a hash of the first data, the second node 12A may subsequently be able to confirm that the first data received using the protocol via the network 13 was the same as that originally sent by the first node 11. This is because the digital signing will be performed using the first node's private key, and therefore only the first node's public key will return the appropriate first data (or hash of the first data, which can be compared against a similarly generated hash of the received first data).

The first node may also encrypt the second data, using the public key of the second node 12A. In addition, if data integrity and non-repudiation is important, the first node may also sign the second data using the private key of the first node 11), this can be done to ensure that only the second node 12A is able to interpret the second data. Encryption may not be necessary where the only objective is for the second node 12A to be able to confirm the first data has not been modified, as a hash of the first data—from which the first data cannot be derived—may be sufficient. However, where the second data contains data which is not supported by the first protocol (i.e. additional data), then the second data may be encrypted to ensure that this data cannot be read by any node other than the second node 12A.

In some embodiments, the first node and the second node have a trust relationship. Moreover, the third node or nodes 14, via which the first data is sent, may not have a trust relationship with the first and the second node. As such, while the second node 12A can trust the second data in the memory 16, the second node cannot trust the first data sent via the untrusted third nodes 14. This may be particularly relevant when the first data, sent using the first protocol, is sent in accordance with a format which can be interpreted by the third node 14. This requirement may be specified by the first protocol. It will be apparent that, being able to interpret the first data, the third node 14 may additionally modify the data. One reason for the third node 14 being able to interpret the data is because the first, the second and the third node are arranged to cooperate in an interaction for which both the second node and the third node require the first data.

It will be apparent that if encryption and/or signing are used, then the memory 16 itself may be publicly available, as only the first node can create the appropriately signed or encrypted data. It will be appreciated that if non-repudiation—that is the ability to confirm the source of the data—is required, then the second data may be signed. Equally if confidentiality is required, then the data may be encrypted. It will be apparent that one or both may be used together.

As mentioned above, the first data is transferred to the second nodes 12A and 12B via one or more third network nodes 14. It will be apparent that each third node 14 will support the first protocol. As such, it may be the case that the one or more third nodes 14 do not support a protocol capable of transferring data of the second type. Nevertheless, any such third node 14 does not require modification for the second data to be transferred to the second node 12A. This makes it easier to transfer the second data, as the modifications to the existing system are small.

Figure 3:
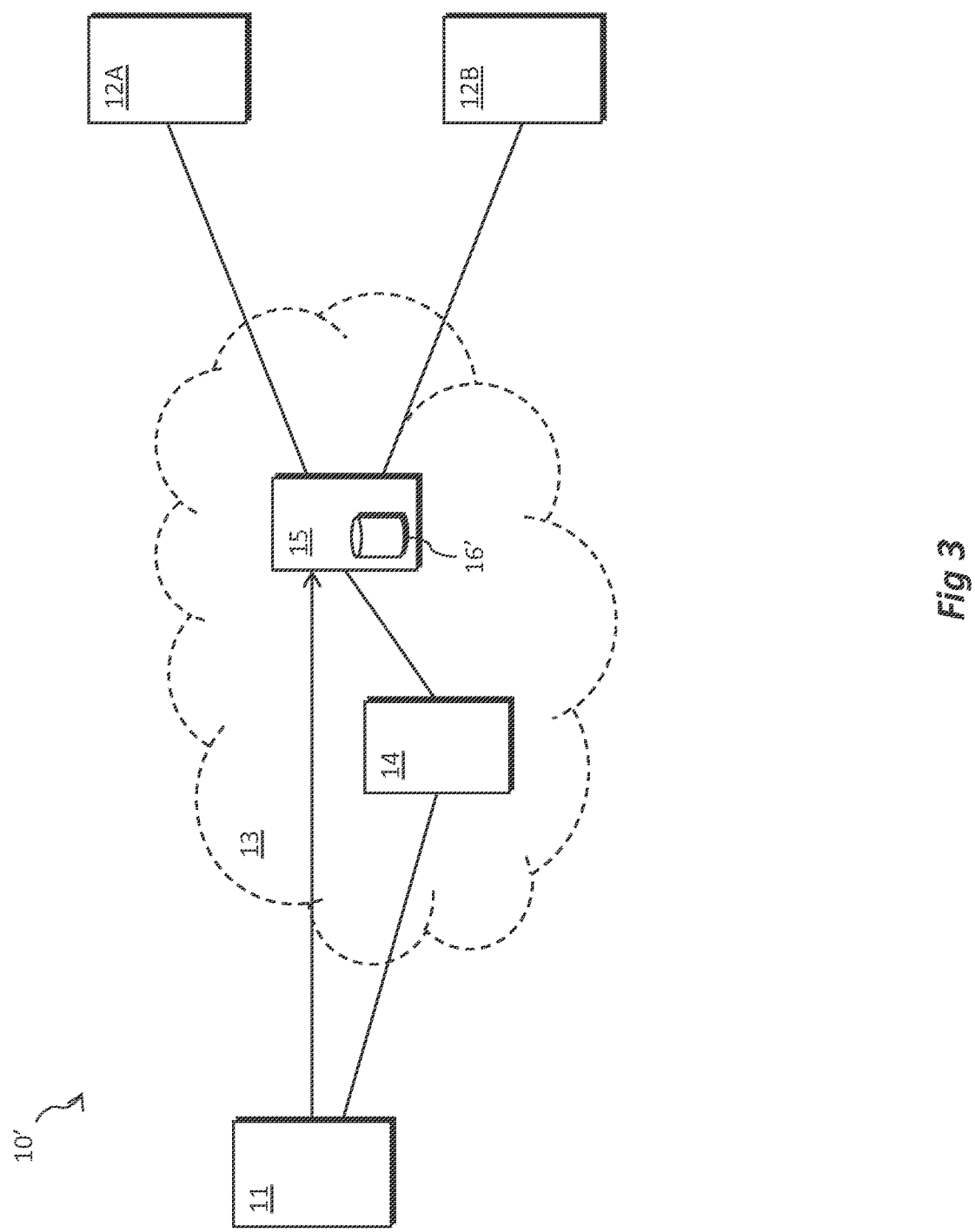
FIG. 3 shows a further schematic diagram of a communications system in which embodiments of the invention may be practiced.

An alternative to system 10 will be described with reference to FIG. 3. Many components of system 10 are the same, and therefore have the same reference numerals. In this alternative system 10', the first node 11 transfers data to the second nodes 12A and 12B via a network 13. The network in turn comprises third node 14 and a fourth node 15. Fourth node 15 differs from third node 14 in that the fourth node 15 comprises memory 16'.

In use, the first node 11 transmits the first data to the third node 14, and the second data to the fourth node 15. The fourth node 15 may maintain the second data in the memory 16' until it is requested by the second node 12A. However, in some embodiments, the fourth node 15 may combine the first and second data and provide the combination to the second node 12A, i.e. the fourth node allows access to the second data by sending the same to the second node 12A with the corresponding first data. This arrangement allows the third node 14 to be bypassed by the second data, which may be required if the third node 14 is not trusted, or is incapable of handling the second data—i.e. if the third node 14 only supports protocols which are incapable of transferring the second data.

Figure 4:
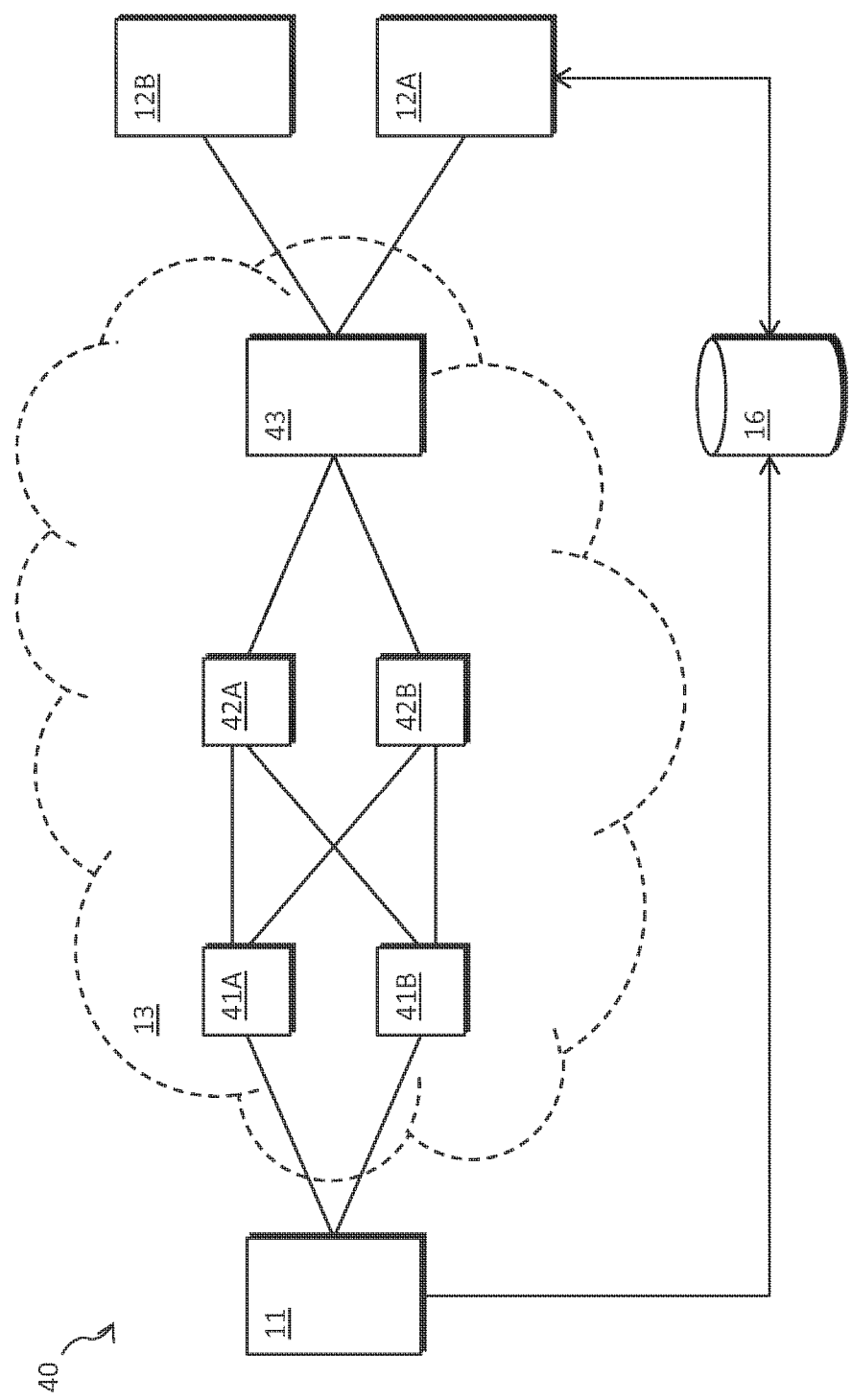
FIG. 4 shows a system in which payment data may be transferred and in which embodiments of the invention may be practiced.

In some embodiments, the communications system comprises a payment processing network. As such, the first data may comprise transaction data. An example of a payment processing system 40 in which embodiments may be practiced will be described with reference to FIG. 4.

As with the above description, data—in this case transaction data—is sent from a first node 11 to second nodes 12A and 12B via a network 13. The data comprise first data, sent using a first protocol and second data which is stored in a memory 16.

The first node 11 may be a source of transaction data or payment data. For example, the first node may be a trusted intermediary arranged to provide transaction data on behalf of a customer. The trusted intermediary may store details of payment methods, such as a primary account number or PAN from a credit card, and may be accessed by a customer as part of an online transaction. Alternatively the first node 11 may be a payment device, capable of communicating both the first and second data. For example, a mobile telephone may be arranged to provide the first data to a merchant to effect a transaction. This first data may, for example, be transferred using near-field communications. Additionally, the first node 11 may provide second data via a mobile communications network. The above are only two examples, and other entities or systems capable of providing the first and second data according to embodiments will be apparent to the skilled person.

The second nodes 12A and 12B may be issuing bank payment processing systems (henceforth issuing banks).

In this embodiment, the network 13 comprises a plurality of Payment Service Providers, or PSPs, 41A and 41B; a plurality of acquiring bank payment processing systems 42A and 42B (henceforth acquiring bank); and a card system data processing system 43. It will be understood that this list of possible entities making up the nodes is not limiting, and the nodes within the network may include, for example, a merchant processing system.

In this example, the first node 11 is connected to the plurality of PSPs 41A and 41B. The PSPs 41A and 41B are in turn each connected to acquiring banks 42A and 42B. Typically a given PSP is connected to multiple acquiring banks, and a given acquiring bank will be connected to multiple PSPs. This leads to the overlap in connections shown. The acquiring banks 42A and 42B are connected to the card system data processing system 43, which is connected to the issuing banks 12A and 12B.

In use, payment data, i.e. the first data described above, may be transmitted from the first node 11 via the network 13 to the issuing banks 12A and 12B using known protocols for transmitting payment data. The payment data is typically transmitted via one PSP and one acquiring bank to the card system, and from there to the issuing banks 12A and 12B. This process is known in the art and need not be described in detail. Nevertheless, since the choice of PSP and acquiring bank is typically made by a merchant, for any given transaction, any combination of PSP and acquiring bank may transfer the first data.

This illustrates a problem with a typical payment processing system. An extension of the existing protocols for transmitting additional data would need to be implemented by all, or at least the majority, of the PSPs, acquiring banks and the card system 43. Since the PSPs, acquiring banks and card system 43 may each be operated by a different company, effecting this implementation of a change in the protocol would be difficult, and require substantial coordination between organizations.

By contrast, embodiments provide a more convenient alternative. First data—the payment data—is sent via the conventional payment network 13 and can therefore be processed in the conventional manner to effect a transaction. In addition, second data may be stored in the memory 16, and subsequently retrieved by a second node 12A (i.e. an issuing bank).

In one particular embodiment, the second data may be used to verify the first data. As such, the second data may be a signed hash of the first data (or similar, as described above). Accordingly, an issuing bank, receiving payment data, will be able to verify that the first data was generated by the first node 11, and that the first data has not been altered in transit. The trust relationship between the first and second nodes described above may be used to enable the second node to trust the first node.

The above is only one implementation of the invention within a payment processing system, and in embodiments, the first node may for example comprise any, or some, of:
  the trusted intermediary arranged to provide transaction data on behalf of a customer as mentioned above;
  a payment device capable of independently providing second data to the memory;
  a merchant data processing system;
  a payment service provider (PSP); and
  an acquiring bank data processing system.

Moreover, the second nodes 12A and 12B, as an alternative (or in addition) to comprising an issuing bank data processing system, may alternatively or additionally comprise:
  a fraud detection processing system;
  an acquiring bank data processing system; and/or
  an accounting system.

Whatever the nature of the first and the second nodes, it will be apparent that any data, related to a transaction, but which is not conventionally processed by existing payment processing systems within network 13, may be stored in the memory 16. For example, a copy of the receipt, or of the information contained on a receipt, may be provided. This information may include a detailed description of the goods or services purchased, a location of the point of sale, an address for delivery, whether any discounts were applied, a geolocation of the payment instrument in relation to any point of sale device used, a device identifier of the point of sale device, an IP address of a point of sale device or of a computer used to make an online purchase, spatial movements, biometric information, etc.

Subsequently, this data may be combined with the actual payment data transmitted via the payment network 13. Where the second node is an accounting system, or an accounting program provided by an issuing bank, the data may be input into an accounting program, enabling customers to review spending in detail.

While the memory 16 has been shown separately, it will be appreciated that the memory may be combined with any of the network nodes. For example the memory may be combined with the card payment system 43. This might be similar to the arrangement for node 15 shown in FIG. 3.

As such, in summary, embodiments may provide a method of processing payment data associated with payment transactions conducted via a network, where the network comprises,
  at least one acquiring bank data processing system,
  at least a first network node, which may be, for example, a trusted intermediary as described above, arranged to provide payment data to at least one of the acquiring bank data processing systems, and
  at least a second network node, which may be, for example, an issuing bank data processing system as described above, arranged to receive payment data from at least one of the acquiring bank data processing system.

During a given payment transaction, payment data associated with the payment transaction may be sent from the first network node to the second network node via the acquiring bank data processing system. In addition, further data associated with the transaction, at least some of the further data being other than the payment data, may be stored at a network node other than the at least one acquiring bank data processing system. Subsequently, access to the further data, by the second network node, may be allowed.

The payment data associated with the payment transaction may be sent from the first network node to the second network node via at least one said acquiring bank data processing system using at least a first protocol, and the further data may comprises data not included in the first protocol.

It will be understood that the data stored in the memory 16 may, in some cases, not be retrieved. As such, the second node 12A may be selective over what data is retrieved. Alternatively, the first node 11 may store second data irrespective of the second node to which the corresponding first data is sent—in other words, the identifying step 21 and 27 may be simplified or omitted. Only second nodes which require the second data, or desire second data for a particular instance, may retrieve the second data. However, in such circumstances, the first node does not require information on which nodes require data and which do not. The memory may store data with a limited lifetime. That is data may be deleted irrespective of whether it has been retrieved after a predetermined period of time.

The network nodes, including those described in relation to the payment system and the memory 16, may comprise computerized hardware as is known in the art. Nevertheless, for completeness, an exemplary computerized system 50, capable of performing the method steps described above, will now be described with reference to FIG. 5.

The computerized system 50 comprises a processing system 51, such as a CPU, or an array of CPUs. The processing system 51 is connected to a memory 52, such as volatile memory (e.g. RAM) or non-volatile memory, for example a solid state (SSD) memory or hard disk drive memory. The memory 52 stores computer readable instructions 53. The system 50 may also comprise an interface 54, capable of transmitting and/or receiving data from other network nodes.

In use the processing system 51 may retrieve the computer instructions 53 from memory 52 and execute these instructions whereby to perform the steps described above. In so doing, the processing system 51 may cause the interface to transmit or receive data as required. This data may itself be stored in memory 52, and retrieved as required—for example to be transmitted via the interface.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. The features of the claims may be combined in combinations other than those specified in the claims.

What is claimed is:

1. A method of data transfer in a communications system, the communications system comprising a first network node arranged to provide a first type of data and a second type of data to a second network node that requires the first type of data and the second type of data, the method comprising:

receiving, by a third network node, the first type of data using a first protocol, the first protocol defining a set of data fields corresponding to the first type of data;

transmitting, by the third network node, the first type of data to the second network node according to the first protocol, wherein the third network node lacks support for transferring the second type of data, and wherein the second type of data does not correspond to any of the data fields defined by the first protocol;

receiving, by a memory that is external to the first, second, and third network nodes, the second type of data from the first network node;

receiving, by the memory from the second network node, a request for the second type of data; and providing, by the memory to the second network node, the second type of data to the second network node, without requiring updating of the third network node to support transferring the second type of data.

2. The method of claim 1, wherein the first type of data comprises a plurality of first data items, and the second type of data comprises a plurality of second data items associated with corresponding first data items.

3. The method of claim 2, wherein said request for the second type of data includes data identifying at least one second data item.

4. The method of claim 3, wherein the data identifying the at least one second data item corresponds to an identity of said second network node.

5. The method of claim 3, wherein the data identifying at least one second data item corresponds to data included in a corresponding first data item.

6. The method of claim 5, wherein the first data items comprise identifiers, and the at least one second data item is stored in association with an identifier of a corresponding first data item.

7. The method of claim 6, wherein at least a part of the at least one second data item is generated using at least a part of a corresponding first data item as an input to a data processing operation.

8. The method of claim 7, wherein the data processing operation computes a hash function.

9. The method of claim 7, wherein the data processing operation computes a digital signature.

10. The method of claim 1, wherein the first network node and the second network node have a trust relationship.

11. The method of claim 10, wherein said third network node does not have a trust relationship with the first and the second network nodes.

12. The method of claim 11, wherein the first type of data received using the first protocol is received in accordance with a format, said format being one that can be interpreted by the third network node.

13. The method of claim 11, wherein the first, the second, and the third network nodes are arranged to cooperate in an interaction for which both the second network node and the third network node require said first type of data.

14. The method of claim 1, wherein the communications system is part of a payment processing network, and the first type of data comprises transaction data.

15. The method of claim 1, wherein the first network node is associated with one or more of:
a merchant data processing system;
a payment service provider (PSP); and
an acquiring bank data processing system.

16. The method of claim 1, wherein the third network node is associated with at least one of:
a merchant data processing system;

a payment service provider (PSP);
an acquiring bank data processing system; and
a card system data processing system.

17. The method of claim 1, wherein the second network node is associated with one or more of:
an issuing bank computing system;
a fraud detection processing system; and
an accounting system.

18. A system comprising:
one or more processors; and
one or more computer readable media, the one or more computer readable media comprising code, executable by the processor for implement operations comprising:
receiving, by a third network node from a first network node, a first type of data using a first protocol, the first protocol defining a set of data fields corresponding to the first type of data,
transmitting, by the third network node, the first type of data to a second network node according to the first protocol, wherein the third network node lacks support for transferring a second type of data, and wherein the second type of data does not correspond to any of the data fields defined by the first protocol,
receiving, by a memory that is external to the first, second, and third network nodes, the second type of data from the first network node,
receiving, by the memory from the second network node, a request for the second type of data, and
providing, by the memory to the second network node, the second type of data to the second network node, without requiring updating of the third network node to support transferring the second type of data.

19. The system of claim 18, wherein in the operations, the third network node modifies the first type of data before transmitting the first type of data to the second network node.

20. The system of claim 19, wherein the system is a card data processing system.

* * * * *